US006972869B2

(12) United States Patent
Harrington

(10) Patent No.: US 6,972,869 B2
(45) Date of Patent: Dec. 6, 2005

(54) MAPPING COLOR TO COLORANT AMOUNTS WHEN COLORANTS HAVE SIMILAR HUE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 930 days.

(21) Appl. No.: 09/740,131

(22) Filed: Dec. 18, 2000

(65) Prior Publication Data

US 2002/0122190 A1    Sep. 5, 2002

(51) Int. Cl.$^7$ ............................ G06F 15/00; G06K 1/00
(52) U.S. Cl. ...................... 358/1.9; 358/2.1; 358/515; 358/518; 358/520; 358/502; 382/163; 382/164; 382/165
(58) Field of Search .......................... 358/1.9, 2.1, 515, 358/518, 520, 502; 382/163, 164, 165

(56) References Cited

U.S. PATENT DOCUMENTS

| 4,641,180 | A | * | 2/1987 | Richter ...................... 348/669 |
| 4,745,466 | A | * | 5/1988 | Yoshida et al. ............. 358/517 |
| 5,237,517 | A | * | 8/1993 | Harrington et al. ......... 382/162 |
| 5,473,446 | A | * | 12/1995 | Perumal et al. ............. 358/523 |
| 5,574,666 | A | * | 11/1996 | Ruetz et al. ................. 358/1.1 |
| 5,588,093 | A | * | 12/1996 | Harrington .................. 358/1.9 |
| 5,657,137 | A | * | 8/1997 | Perumal et al. ............. 358/502 |
| 6,088,122 | A | * | 7/2000 | Coleman ..................... 358/1.9 |
| 6,185,013 | B1 | * | 2/2001 | Harrington et al. ......... 358/520 |
| 6,499,829 | B1 | * | 12/2002 | Tabata et al. ................. 347/43 |
| 6,721,069 | B1 | * | 4/2004 | Harrington .................. 358/3.2 |
| 6,757,428 | B1 | * | 6/2004 | Lin et al. ..................... 382/165 |
| 2003/0169438 | A1 | * | 9/2003 | Velde et al. ................. 358/1.9 |
| 2004/0227967 | A1 | * | 11/2004 | Mahy et al. ................. 358/1.9 |

* cited by examiner

Primary Examiner—Kimberly Williams
Assistant Examiner—Michael Burleson
(74) Attorney, Agent, or Firm—Fay, Sharpe, Fagan, Minnich & McKee, LLP

(57) ABSTRACT

A method for mapping a color specification to colorant amounts when a first and a second colorant have a similar hue involves the division of portions of color space into regions. Colors of the similar hue are rendered with a first colorant, a second colorant or a blend of the first and second colorants depending on which region of a color specification space the color specification is related. An image processor operative to map color descriptions via the method includes a colorant splitters operative to map a color description to colorant amounts for colorants of similar hue. In a xerographic environment, such an image processor includes a xerographic printer.

28 Claims, 11 Drawing Sheets

$C_0 = 1 - R - K_0$

FIG. 14
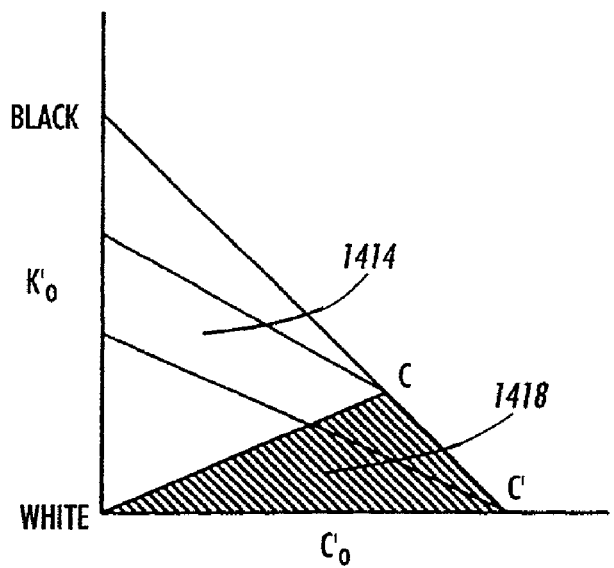
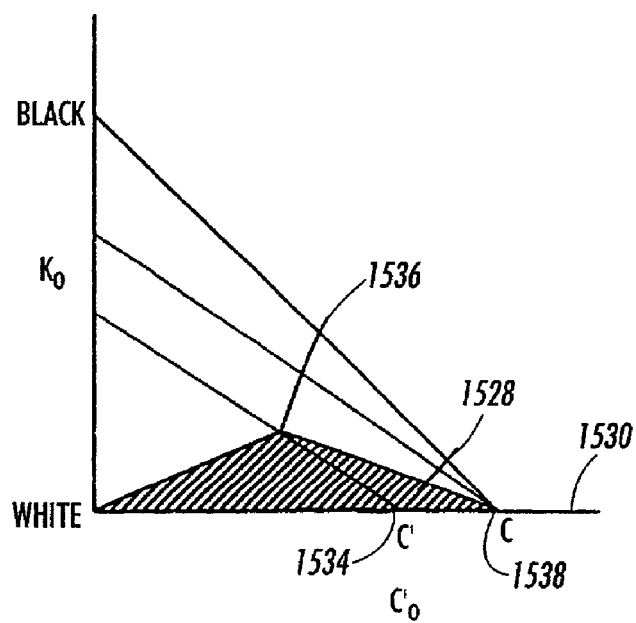
FIG. 15

MAPPING COLOR TO COLORANT AMOUNTS WHEN COLORANTS HAVE SIMILAR HUE

BACKGROUND OF THE INVENTION

1. Field of the Invention

The invention relates to the art of color mapping. The invention finds application where inks or colorants having similar hue are used to render an image or color. For example, the invention finds use where cyan, fluorescent cyan, magenta, fluorescent magenta, yellow and fluorescent yellow colorants are available for use in rendering an image. Colorants in colorant pairs, such as, for example, cyan and fluorescent cyan, have similar hues, but vary in intensity and saturation. The invention is related to the art of mapping color specifications to colorant amounts and applying colorants to render a color or an image.

2. Description of Related Art

Conventional color printers, or image rendering devices, use three or four colorants, or inks, to produce output. For example, many printers use cyan (C), magenta (M), and yellow (Y) colorants in the production of printed images. Additionally, a neutral or black colorant (K) is sometimes used to vary color intensity and/or as a substitute for neutral components of colorant combinations. Due to a non-ideal nature of available colorants, the range of printable colors, or color gamut, of available printers, is much smaller than the range of colors that are perceivable by the human eye. Therefore, it is desirable to use additional colorants in rendering images. For example, the use of additional colorants enlarges the color gamut of a rendering device, thereby improving image quality. Additionally, extra colorants are useful in producing special effects.

However, as the number of available colorants increases, so does the number or ways any particular color can be rendered. For example, where two types of cyan colorant (C and C') are available and two types of yellow colorant (Y and Y') are available, a given shade of green is produced by using the C and Y colorants, or the C and Y' colorants, or the C' and Y colorants or the C' and Y' colorants. Alternatively, the particular shade of green may be produced by using appropriate amounts of each of the colorants C, C', Y, and Y' or any of a number of other subsets of the colorants. Colorants of similar hue, are, to some degree redundant because gamuts of colors that can be produced with them overlap. Therefore, colorants of similar hue are called redundant colorants. It is difficult to select a particular combination of redundant colorants to produce any given color. Additionally, an appropriate amount of each chosen colorant must also be determined.

Prior art image processing systems, such as, for example, personal computers, desktop publishing systems, reprographic systems, and document processors, such as, for example, devices operating in a xerographic environment, are concerned with the art of color conversion or transformation. An image described in terms of a first color coordinate system or color space is often rendered using a device that operates in a second color space. For example, an image described in terms of one of the well-known CIEXYZ, CIEL*a*b*, or standardized RGB color spaces, is often rendered with a device that operates in a CMYK color space. Therefore, many techniques are available for converting a color specification or description from one color space to another.

For example, a well-known, simple, technique for converting from red, green, and blue values (RGB) to cyan, magenta, yellow, and black values (CMYK) is explained as a two-stage process.

The first stage uses the following equations, or their equivalents:

$$C_1 = 1-R$$

$$M_1 = 1-G$$

$$Y_1 = 1-B$$

Where $C_1$, $M_1$, and $Y_1$ denote intermediate values of cyan, magenta and yellow respectively and R, G, and B denote values of red, green, and blue colorants respectively. Of course, these equations assume all colorant values are normalized to a range from zero to one. This convention will be used throughout this document, unless otherwise specified.

The second stage is often called gray color replacement or undercolor removal. Equal amounts of cyan, magenta and yellow combine to be perceived as a shade of gray. Therefore, a portion of these colorants can be replaced with a black colorant. The second, or undercolor removal stage is implemented with the following equations:

$$K_0 = \min(C_1, M_1, Y_1)$$

$$C_0 = C_1 - K_0$$

$$M_0 = M_1 - K_0$$

$$Y_0 = Y_1 - K_0$$

Where the "min" function returns the minimum of the three values. In this manner, $K_0$ is given the value of the minimum of the three colorants. Additionally, as one can see from the equations, the value of $K_0$ is subtracted from each one of $C_1$, $M_1$, and $Y_1$ to generate $C_0$, $M_0$, and $Y_0$. Note that the value of one of $C_0$, $M_0$, and $Y_0$ is zero. $C_0$, $M_0$, $Y_0$, $K_0$ denote final cyan, magenta, yellow and black values of a prior art or classic CMYK pixel, respectively.

These equations would render a perfect transformation if the inks or colorants involved were ideal. Of course, ideal colorants are not generally available. Therefore, this simple transformation is used where exact color matches are not required or where lack of image authorship information prevents a reliable improvement over the simple transformation.

Where calibration information is available with regard to both image authorship and image rendering devices, the simple technique is often enhanced or modified to include color correction. For example, look up tables or tone reproduction curves are used to correct colorant values. Tables are formed to give the CMY or CMYK values directly from the input RGB values, or alternatively, raw RGB values are corrected or modified to produce corrected RGB values that compensate for differences between an authorship device and a rendering device. The corrected RGB values are then applied to the equations above.

Whatever color conversion techniques are used in prior art image processors, the ultimate output of the color conversion technique is a set of values or colorant amounts related to the colorants used in a target rendering device. For example, ultimately a mapping or transformation technique used in conjunction with a CMYK printer provides colorant values $C_0$, $M_0$, $Y_0$, $K_0$.

A vast library of conversion and correction techniques is readily available. The library represents a large investment. A large amount of both time and money has been spent creating and perfecting that library.

The use of additional colorants of similar hue to those available in the prior art can improve rendered image quality. A library of color correction and transformation techniques is available for classic colorant combinations. Therefore, a method for mapping a classic color specification to colorant amounts when a rendering device can use both a classic set of colorants as well as a set of additional colorants having similar hue to the prior art or classic colorants, that takes advantage of the current library of correction and transformation techniques is desired.

BRIEF SUMMARY OF THE INVENTION

To those ends, a method of mapping a color specification to colorant amounts when a projected region of color space is to be produced by a selection of colorants from a set of including a first colorant, a second colorant and a third colorant, the second colorant being of similar hue with respect to the first colorant, a has been developed. The method comprises designating a first portion of the region to be produced by a first subset of colorants consisting of two of the first, second and third colorants, designating a second portion of the region to be produced by a second subset of colorants, and mapping the color specification into colorant amounts based on the designated portions.

An image processing system operative to use the method to map a color specification to output colorant amounts where the output colorants include two colorants of similar hue comprises a colorant splitter operative to receive the color specification and map the color specification to similar hue output colorant values.

Some embodiments further comprise a plurality of colorant splitters, each colorant splitter operative to receive a subset of values from an input pixel and generate a subset of output pixel values, the subset of output pixel values including two colorant values for two colorants of similar hue, the output of each of the plurality of colorant splitters being combined to form a pixel. Additionally some embodiments comprise a blender and redundant colorant undercolor remover. The blender is operative to receive pixel information, and to perform a weighted blend of the associated ones of the plurality of colorant splitters based on colorant values of the input pixel. The blender generates a blended output pixel. The undercolor remover is operative to receive the blended output pixel and perform undercolor removal on the blended output pixel to generate an output pixel that includes a neutral colorant value.

One advantage of the present invention resides in the ability to use prior art printer drivers to drive rendering devices that include redundant colorants.

Another advantage of the present invention is found in a smooth or monotonic transition in colorant combinations provided by the invention.

Yet another advantage of the present invention is that colors are mapped in a computationally inexpensive manner.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

FIG. 14 shows the division of FIG. 5 applied to the transformed region of FIG. 13;

FIG. 15 shows the overall effect of the transformation of FIG. 13 and the division of FIG. 14 as viewed in terms of the untransformed color specification region;

DETAILED DESCRIPTION OF THE INVENTION

The invention will be described in terms of exemplary embodiments. The exemplary embodiments are operative to map CMYK values to CMYC'M'Y'K values. Here, the primed values (C', M', Y') represent colorant amounts for additional colorants that have hues similar to the hues of the C, M, Y colorants respectively. However, it is understood that the invention may be applied to other sets of colorants. For example, an additive color device containing red, green and blue (R, G, B) light sources, and secondary light sources (R', G', B') with different saturation and lightness behaviors but similar hues to the RGB sources could be controlled by the methods of this invention.

The set of additional colorants (C', M', Y') used in any given application is based on a desired use or effect. For example, where C', M', and Y' are lighter versions of the original colorants they can be used to reduce contrast in the highlight portions of color space, thereby improving image quality. Alternatively, where C', M', and Y' are fluorescent versions of the original colorants they can be used to enlarge the color gamut of the rendering device.

Figure 1:
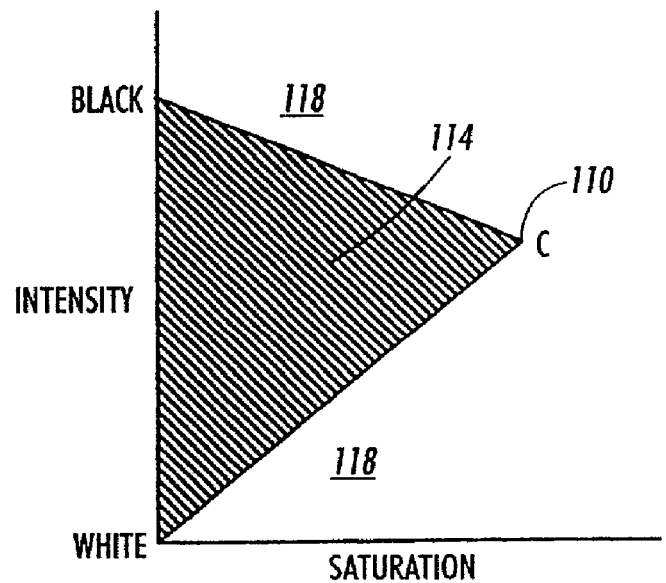
FIG. 1 is a first color gamut of a neutral colorant and a non-neutral colorant described in an intensity-saturation space.

Referring to FIG. 1, a first colorant, such as, for example, a first cyan colorant C, is combined with a neutral or black colorant to generate a first gamut 114 or range of tints and tones. Variations in the amounts of the black and the first cyan colorant C produce colors having a cyan hue but varying in saturation and intensity. Significantly, certain tints and tones 118 are not producible by any combination of the black colorant and the first cyan colorant C.

Figure 2:
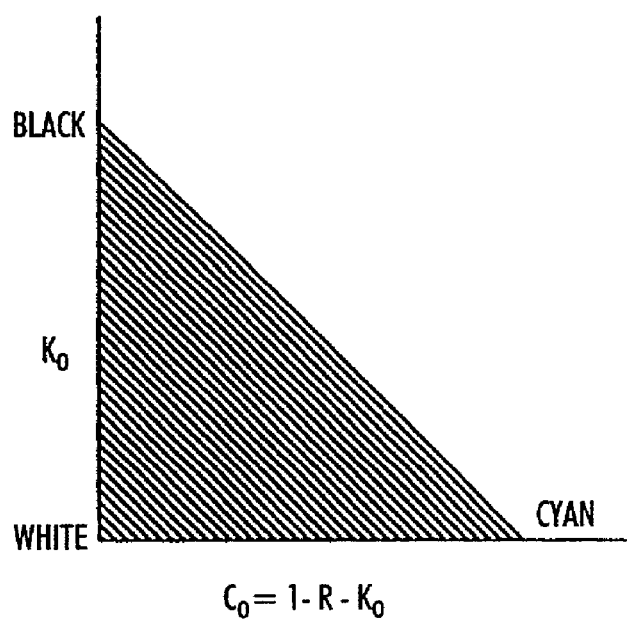
FIG. 2 depicts a range of the neutral and non-neutral colorant amounts that generate the gamut of FIG. 1.

FIG. 2 illustrates a range of colorant amounts ($C_0$, $K_0$) available to produce the first color gamut 114. As described in the example above, $C_0$ may be calculated from pixel values from another color space such as, for example, RGB. In that case, again, as described above, $C_1 = 1-R$ and $C_0 = C_1 - K_0$ so $C_0 = 1 - R - K_0$.

Figure 3:
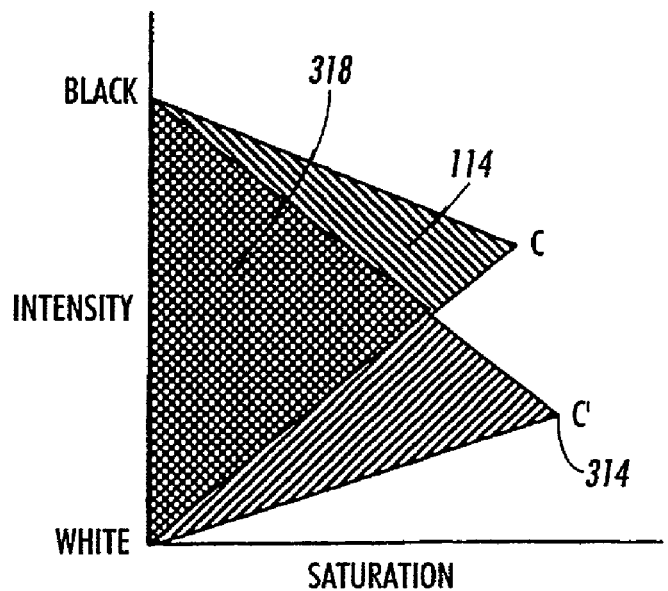
FIG. 3 shows the first color gamut in relation to a second color gamut, wherein the second color gamut is producible by combining the neutral colorant with a second non-neutral colorant, the second non-neutral colorant having a similar hue to that of the first non-neutral colorant but differing in lightness and saturation.

Referring to FIG. 3, a second color gamut 314 describes a second range of tints and tones that are produced when various amounts of a second cyan colorant C' are combined with various amounts of the black or neutral colorant. The second gamut 314 is shown in comparison to the first gamut 114. Some of the un-producible tints and tones 118 are included in the second gamut 314. An overlap region 318 includes tints and tones that can be achieved with mixtures of either the neutral colorant and the first colorant C or the neutral colorant and the second colorant C'. Additionally, tints and tones in the overlap region 318 may be rendered with combinations of all three colorants.

Figure 4:
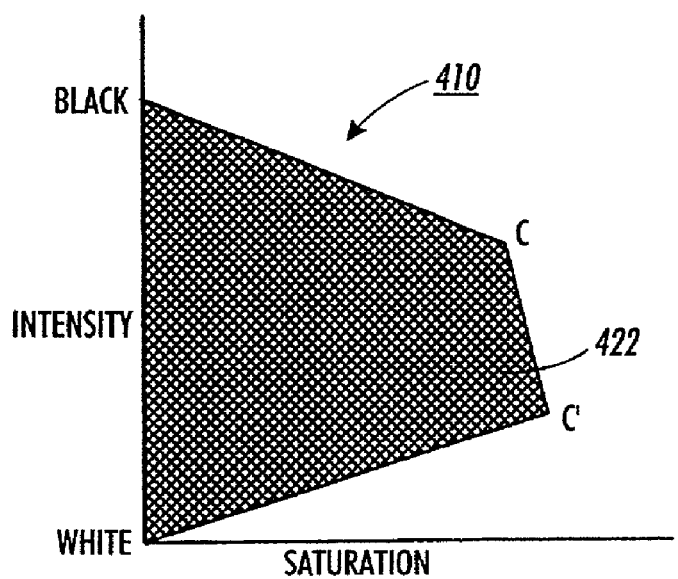
FIG. 4 shows a gamut achievable when the neutral colorant is used in combination with both the first and the second non-neutral colorants.

Referring to FIG. 4, when both the first C and second C' colorants of similar cyan hues are available, a combined gamut 410 of renderable tints and tones is greater than the sum of the individual gamuts 114, 314. The combined gamut 410 is the convex hull of the first 114 and second 314 gamuts. Through the use of both the first C and second C' colorants a new set 422 of tints and tones of the similar hue, that are not included in either of the first 114 and second 314 gamuts, can be produced.

Since certain tints and tones can be produced by a number of different colorant combinations, some method of selecting one of the colorant combinations is needed. For example, one may wish to minimize the use of one of the colorants. For instance, the second colorant C' may be more expensive or less light-fast than the first colorant C. Therefore, in that case, it is desirable to minimize the use of the second colorant C'.

Figure 5:
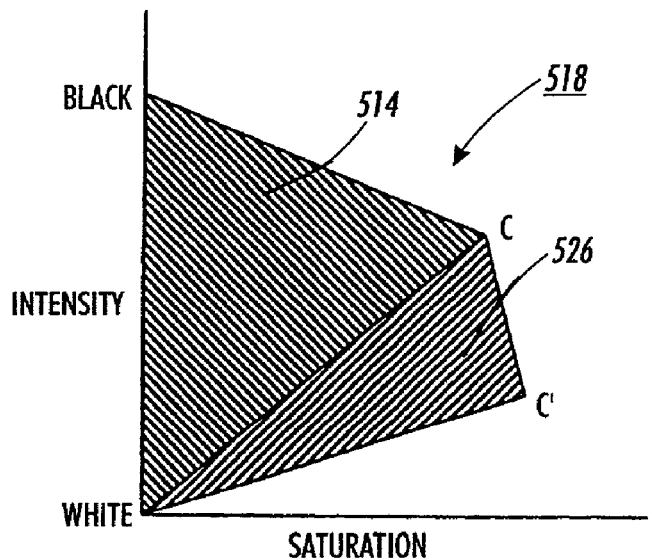
FIG. 5 shows the gamut of FIG. 4 divided or segmented into regions each region designated to be produced by different subsets of the three colorants.

Referring to FIG. 5, a strategy for minimizing the use of the second colorant C' is to use only combinations of the neutral colorant and the first colorant C for all colors within a first gamut portion 514 of a partitioned combined gamut 518. The second colorant C' is only used to produce colors in a remaining gamut portion 526 of the partitioned combined gamut 518. The colors in the remaining gamut portion 526 are outside of the first gamut portion 514.

Figure 6:
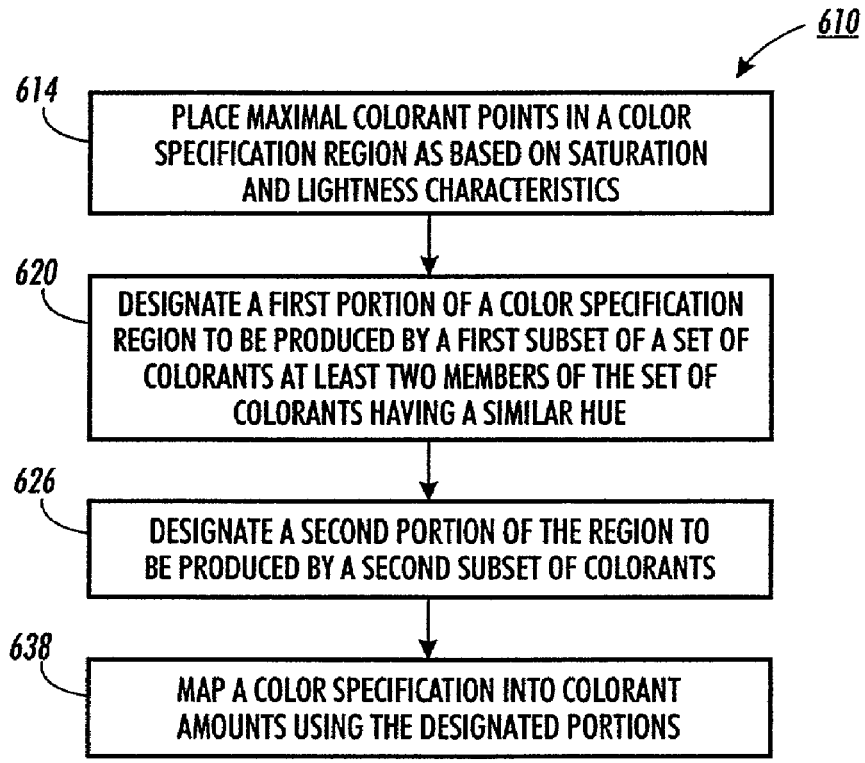
FIG. 6 is a flow diagram outlining a method for mapping a color specification to colorant amounts when various portions of a color specification region are to be produced by various subsets of a set of colorants including colorants of similar hue.

Referring to FIG. 6, a method 610 that can be used to implement such a strategy for mapping a color specification to colorant amounts when various portions a color specification region are to be produced by a subset of colorants, from a set of colorants, such as, for example the neutral, first C and second C' colorants, begins with a maximal colorant value placement step 614. In the maximal colorant placement step 614, a selected input color specification is mapped to a maximal colorant value based on saturation and lightness characteristics of the colorants. For example, a pure and maximum color specification ($C_0=1$, $K_0=0$) is mapped to a maximal second colorant C' value (C'=1). Additionally, another selected input color specification, such as for example ($C_0=1-b$, $K_0=b$) is mapped to a maximal first colorant C value (C=1). The value b is chosen to reflect the proportion of the color specification space to be devoted to the two gamut portions. In a first portion designation step 620 a first portion of the color specification region is designated to be produced by, for example, the neutral colorant and the first colorant C. In other words, the second colorant is not used to produce colors encompassed by the first portion of the color specification region. Similarly, in a second portion designation step 626, a second portion of the color specification region is designated to be produced by combinations of, for example, the first and second colorant. In other words, the neutral colorant is not used to produce colors in the second portion. In a color mapping step 638, color specifications are then mapped to colorant amounts by formulas that specify colo amounts based on their position within the portions. The mapping formulas are, for example, simple linear expressions that yield designated color specifications at the vertices of the triangular regions. Note that different mapping formulas are needed for each of the regions.

Figure 7:
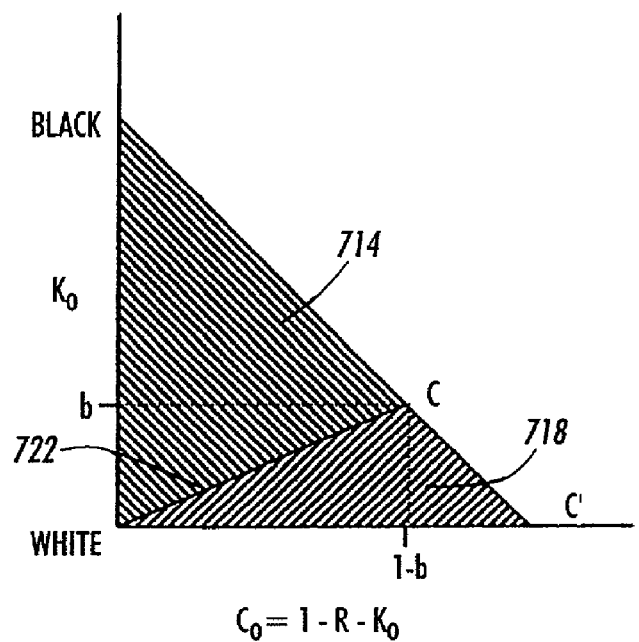
FIG. 7 shows a color specification region divided into designated regions according to the method of FIG. 6.

For example, referring to FIG. 7, the range of colorant amounts ($C_0$, $K_0$) of FIG. 2 is overlaid with a first 714 and a second 718 section designation. In this way a prior art or classic color specification $C_0$, $K_0$ can be located within one of the two sections 714, 718. A boundary 722 separates, or creates, the two sections 714, 718. For example the boundary 722 is a line having a slope s. The slope s is calculated from a slope equation:

$$s=b/(1-b)$$

Where b is a constant chosen to control the relative proportions of the two sections 714, 718. A segment identifier equation:

$$x=K_0-s*C_0$$

is used to identify which section a classic color specification $C_0$, $K_0$ is related to. For example, if x is positive then the classic color specification $C_0$, $K_0$ is related to the first section 714 and therefore the first colorant C and the neutral colorant are to be used to render the color specified by $C_0$, $K_0$. If x is negative then the classic color specification $C_0$, $K_0$ is related to the second section 718 and a different colorant combination is used.

It is desirable to use a full gamut (ranging from zero to one in normalized space) of the first colorant C. However, the segmentation scheme of FIG. 7 limits the first colorant to a particular maximum value (1−b) that is less than one. Additionally, the segmentation scheme of FIG. 7 calls for color specifications $C_0$, $K_0$ that are related to the second segment 718 to be rendered with the combinations of all three of the neutral, first C and second C' colorants. However, the strategy being applied is to render color specifications related to the second segment 718 with only the first C and second C' colorants. Therefore, referring to FIG. 8 and FIG. 9 a color mapping formula is used for the first region that can be interpreted geometrically as a warping operation. The effect of this warping as applied to the first 814 and second 818 segments (as indicated by arrows 822) is to generate or create warped first 914 and second segments 918 in a new ($C_w$, $K_w$) space.

The color mapping formula (or warping) for the first region is given by two equations:

$$K_w = K_0 - s*C_0 = x$$

$$C_w = C_0/(1-b)$$

In the first segment 814, $K_w$ is added back into the $C_w$ equation to get a value that corresponds to no undercolor removal. The following simple equation is generated in that process:

$$C = C_0 + K_0$$

In the first warped segment 814 C'=0.

Color specifications ($C_0$, $K_0$), that are related to the second warped segment 818 are mapped to a combination of the first C and second C' colorants. The combination does not include any neutral colorant. An upper boundary 822 of the second warped segment 818 is a line. The line includes a set of points specifying a range of colors from a white point 826 to a first colorant point 830 specifying a maximum density of the first colorant C. A lower boundary 834 of the second warped segment 818 also includes the white point 826. Additionally, the lower boundary terminates in a second colorant point 838 specifying a maximum density of the second colorant C'. Points on the lower boundary 834 between the white point 826 and the second colorant point 838 specify colors from solid white to solid C'. The remainder of the second warped segment 818 specifies combinations of various amounts of both the first colorant C and the second colorant C'.

A linear mapping of region 818 that gives the describe behavior at vertices, namely white at 826, full colorant C at 830 and full colorant C' at 838 is given by:

$$C = K_0/b$$

$$C' = C_0 - K_0/s$$

$$K = 0$$

Since the value of K given by this mapping is zero, adding the undercolor back does not change the expression for the C and C' values.

It will be obvious to those of ordinary skill in the art, that similar mappings may be done for other colorants used by a rendering device. For example, similar mappings are done for a magenta colorant pair M, M' and a yellow colorant pair Y, Y'. Therefore, the method 610 is applicable to each of the colorant color specifications in a pixel. For example an RGB pixel is mapped to a C'M'Y'CMY pixel by forming a temporary, internal CMYK specification and applying the method 610 to each of the colorant color specifications (C,K), (M,K), (Y,K)

The above described mapping maps a solid and pure cyan color specification ($C_0 = 1$, $K_0 = 0$) to a solid or maximal second colorant C' amount. Therefore, preferably, the above described mapping is applied when the second C', or lighter colorant is also the most saturated. However, this is not always the case. There are instances where the first colorant is both darker and more saturated than the second colorant. In that case, using the above mapping leads to discontinuities or non-monotonic behavior when rendering, for example, a color sweep. Therefore, the above mapping is undesirable, when the first colorant is both darker and more saturated that the second colorant.

A mapping that maps a pure, maximal color specification to a darker colorant is beneficially applied when the darker colorant is also the more saturated colorant in a colorant pair of similar hue. For example, referring to FIG. 10, a second mapping 1010 allocates a saturated colorant specification corner 1014 to the first colorant C. A first or light segment 1018 encompasses colors that can be rendered with the second colorant C' and the neutral colorant. The first segment 1018 is bounded by points that specify white (0,0), black (0,1) and an intermediate point on the non-neutral axis (1−b, 0). A transition between the second colorant C' and the first colorant C takes place in a second or darker segment 1022. The second segment is bounded by points that specify the intermediate point on the non-neutral axis (1−b, 0), black (0, 1) and the point of full saturation 1014 on the non-neutral axis. A boundary 1026 between the first 1018 and second 1022 segments is a line. The equation of the line leads to a classification quantity $K_0 + C_0/(1-b)$. If the classification quantity is less than one for a particular color specification ($C_0$, $K_0$) then the color specification is related to the first segment 1018. If the classification quantity is one or more then the color specification is related to the second segment 1022. Mapping equations for color specifications that are related to the first segment 1018 are:

$$C' = C_0/(1-b) + K_0$$

$$C = 0$$

Mapping equations for color specifications that are related to the second segment 1022 are:

$$C' = (1 - C_0 - K_0*(1-b))/b$$

$$C = K_0 - C'$$

Again, this embodiment of the method 610, is equally applicable to other colorants, such as, for example a magenta colorant pair M, M' and a yellow colorant pair Y, Y'. For example, similar mappings are done for a magenta colorant pair M, M' and a yellow colorant pair Y, Y'. Therefore, the steps 614, 620, 626, 632, 638 maybe repeated for each non-neutral colorant color specifications in a pixel. For example, a CMYK pixel is mapped to a CMYC'M'Y' colorant values by applying the extended method 610 to the colorant color specifications ((C,K), (M,K), (Y,K)).

Once a full set of non-neutral colorant values (CMYC'M'Y') is determined, a redundant colorant undercolor removal step 642 is applied. For example, an undercolor amount u is calculated from:

$$u = MIN(C + C', M + M', Y + Y')$$

Preferably, only a fractional amount $K_f$ of the undercolor amount u is removed from the non-neutral colorant amounts. For example the fractional amount is calculated from the equation:

$$K_f = f*u$$

Where f is a predetermined fractional variable or constant. For example, the value of f is a function of the color. For instance, f is a function of u. When u is large (as in regions of shadow) f is one. As u decreases (as in lighter regions) f decreases as well and less under color is removed. $K_f$ is used to fractionally reduce the non-neutral colorant amounts by a corresponding amount in a manner best explained through the use of the following exemplary equations:

$$C_f = C(1 - K_f/(C + C'))$$

$$C_f' = C'(1 - K_f/(C + C'))$$

Of course, those of ordinary skill in the art will understand how the undercolor process is repeated for the remaining colorants. A final seven colorant pixel is then denoted as $C_fM_fY_fC_f'M_f'Y_f'K_f$.

Figure 10:
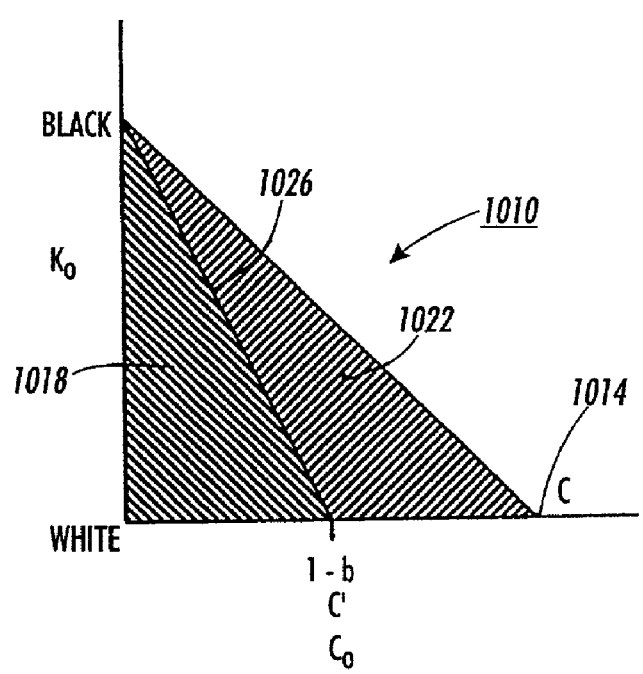
FIG. 10 shows a color specification region divided into designated regions according to the method of FIG. 6 in a manner different than that depicted in FIG. 7.

The mapping described in reference to FIG. 10 is relatively simple. Unfortunately, the FIG. 10 mapping may not be optimal. For example, a large fraction of cyan colors are produced with the second colorant C'. If the second colorant C' has some undesirable property, then the FIG. 10 mapping may be a poor choice. For example, if the second colorant C' is more expensive than the first colorant C or if the second colorant C' is less light fast than the first colorant C another mapping may be better. Additionally, for the FIG. 10 mapping, the transition between C' and C takes place in a region of full coverage (C+C'+K=1) instead of a highlight region of the color specification region (as in the previous mapping). Although K here is only a color specification device that will be reintegrated into C and C', black ink may again emerge after overall undercolor removal, yielding regions of total coverage by the combination of C, C' and K inks. Therefore, if a rendering device does not have perfect colorant registration or if one of the colorants does not work well next to black or neutral colorant, the FIG. 10 mapping is undesirable.

Figure 11:
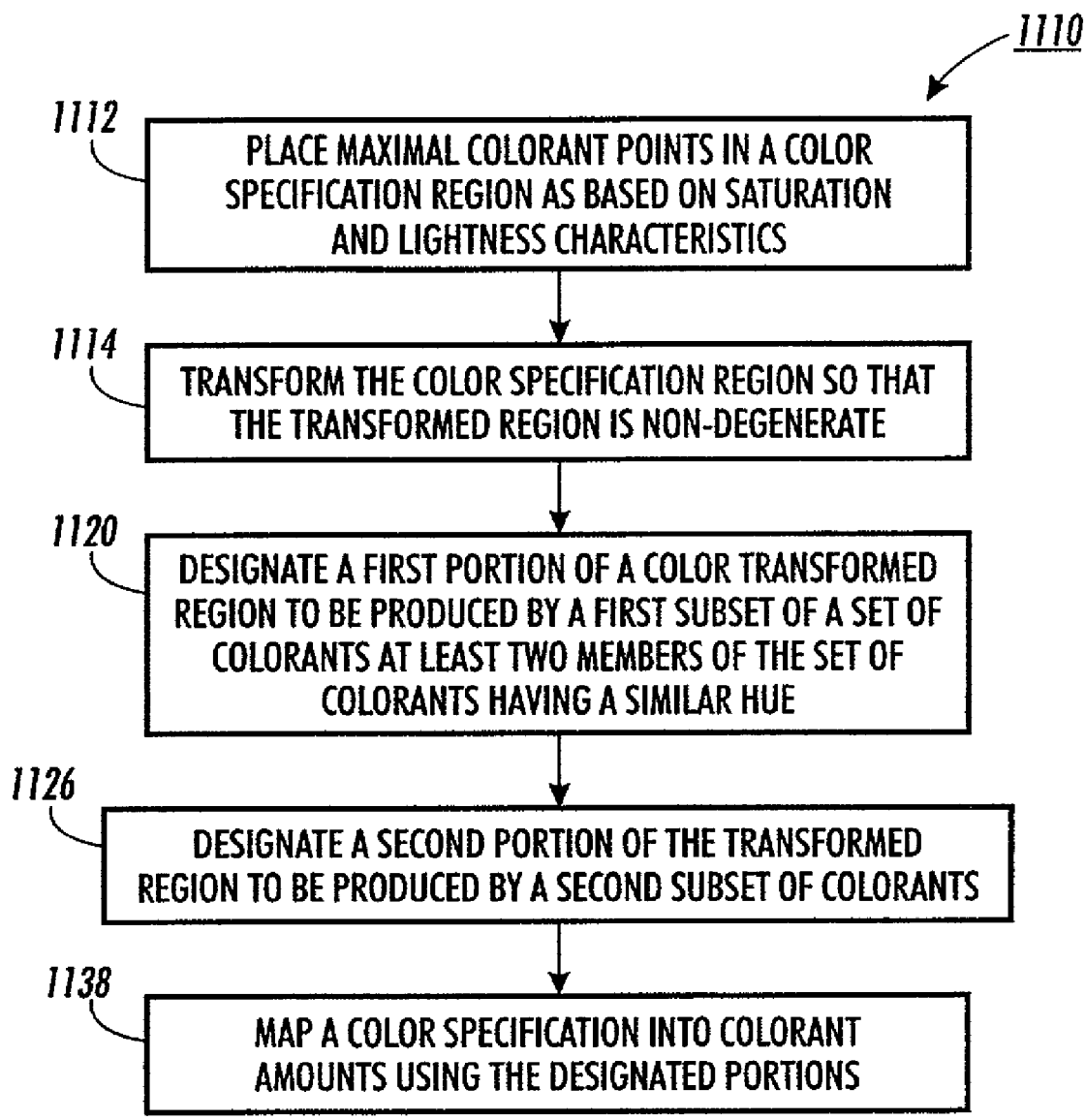
FIG. 11 is a flow diagram outlining an extension of the method of FIG. 6.

Referring to FIG. 11, an extended method 1110, extending the method 610 of FIG. 6, to handle the case where it is best to map the fully saturated pure color specification ($C_0=1$, $K_0=0$) to the darker first colorant C, begins with a maximal point placement step 1112 that is similar to the maximal point placement step 614. That is followed by a transformation step 1114. The remainder of the method 1110 comprises a first portion designation step 1120, a second portion designation step 1126, and a color-mapping step 1138. Those steps 1120, 1126, 1132, 1138 of the extended method 1110 are similar to similarly named steps of the method 610. In practice, they are repeated for each colorant in the input or classic color specification ($C_0,M_0,Y_0,K_0$).

Figure 12:
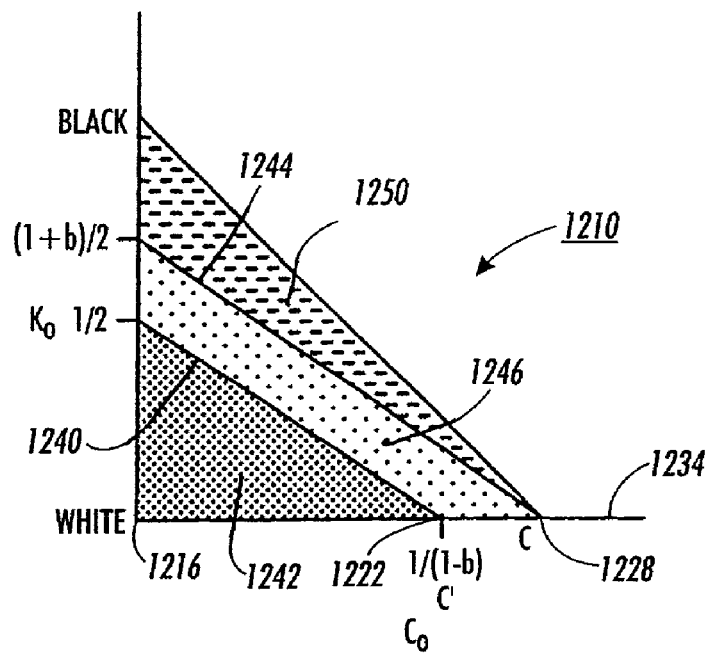
FIG. 12 and FIG. 13 diagram the placement of maximal colorant points and a transformation of a color specification region.
Figure 13:
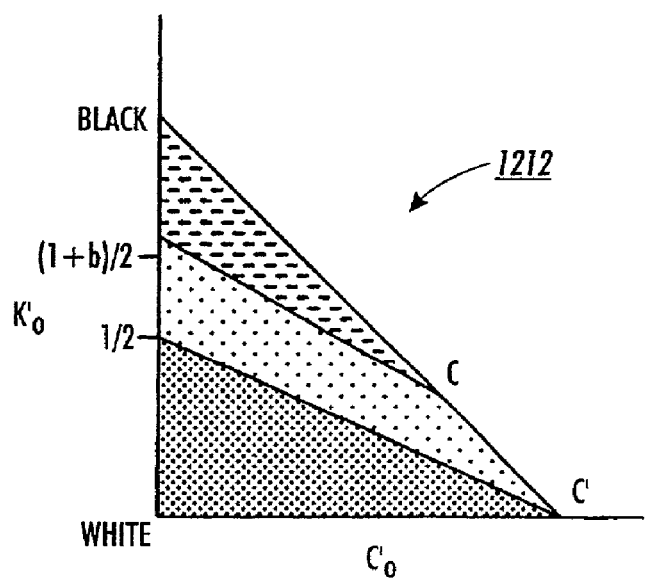

Referring to FIG. 12 and FIG. 13, the transformation step 1114 transforms a degenerate color specification region 1210, to a non-degenerate color specification region 1212. Preferably, the transformation step 1114 generates a non-degenerate color space 1212 for which a color mapping method is known.

For example, before transformation, extreme points in the color specifications space 1210, which correspond to pure maximum or minimum amounts of colorant, are collinear. For instance, a white point 1216 (corresponding to a minimal neutral colorant value), a maximal second colorant C' point 1222, and a maximal first colorant point 1228 all lie on a non-neutral colorant axis 1234. This distribution ensures that a pure maximally saturated color specification ($C_0=1$, $K_0=0$) is mapped to the more saturated first colorant C. The specification for the lighter, less saturated colorant C' should be placed closer to the white point with respect to the non-neutral axis than the point that maps to C (to account for its saturation) and at least as far down the neutral axis (to account for its lightness). This leaves the C' point positioned along the base of the triangular region 1242. Nevertheless, the distribution is problematic. The strategy here is to designate a region for which only the colorant C and C' and the white of the media are selected. The area of this region maps to the various combinations of C, C' and white. The regions should be bounded by the three points. However, since the points are placed in a line in the color specification space, as driven, or based on, saturation and lightness characteristics of the colorants, the region bounded by the points has zero area. There is no two-dimensional region that can be used to map to the two-dimensional color. For this reason and others, this collinear distribution of colorant extremes is referred to as a degenerate case, or distribution. The transformation step 1114 removes the degenerate nature of the distribution, while allowing the advantageous saturated color specification mapping to be maintained.

An exemplary transformation is begun by dividing the color specification region 1210 into three segments based on the locations of the maximal non-neutral colorant points 1222, 1228. Preferably, the divisions are selected to make subsequent calculations computationally inexpensive. For example, a first dividing line 1240 defining a first segment 1242 and a second dividing line 1244 defining a second segment 1246 and a third segment 1250, are selected to be parallel, and therefore, have the same slope. The regions are transformed so that the maximal second colorant C' point 1222 and the maximal first colorant C point 1228 are shifted to positions similar to those they have in FIG. 7. This allows the mapping method 610 applied to the color specification sections 714 and 718 to be applied to the transformed color specification region 1212.

Since the first dividing line 1240 and the second dividing line 1244 have the same slope, the equations for both lines can be written:

$$z=K_0+C_0*((1+b)/2)$$

where z is a neutral axis intercept. By inspection, for the first dividing line 1240:

$$z=1/2$$

and for the second dividing line:

$$z=(1+b)/2$$

These equations are useful for determining which segment 1242, 1246, 1250 a particular color specification ($C_0, K_0$) is related to.

For example, if for a particular color specification ($C_0, K_0$), $z>(1+b)/2$, then that specification is related to the third segment 1250. The transformation relates values in $C_0, K_0$ space to values in a $C_0', K_0'$ space. In the third segment 1250, the relationship is characterized by the equations:

$$C'_0=(1-b)*C_0$$

$$K'_0=z-C'_0/2$$

The equation for $K'_0$ is the same for all three segments 1242, 1246, 1250. Note: When used with $C'_0$, $K'_0$, the prime "'" denotes a transformed color specification.

If for a particular color specification ($C_0, K_0$), $(1+b)/2>z<\frac{1}{2}$, then that specification is related to the second segment 1246. In the second segment 1246, the non-neutral colorant relationship is characterized by the equation:

$$C_0'=(1+b)*(1-z)*C_0/(2*z)$$

If for a particular color specification ($C_0, K_0$), z is less than or equal to ½, then that specification is related to the first segment 1242. In the first segment 1242, the non-neutral colorant relationship is characterized by the equation:

$$C_0'=(1+b)*C_0$$

Referring to FIG. 14, as mentioned above, once the transformation is complete the method 610 (as embodied in the remaining steps 1120, 1126, 1132, 1138 of the extended method 1110) is applied to transform values in $C'_0$, $K'_0$ space. Therefore, the overall mapping equations of the extended method 1110 become:

$$C = C_0' + K_0'$$

$$C' = 0$$

in a first segment 1414, and $$C = K_0'/b$$

$$C' = C_0' - K_0'/s$$

in a second segment 1418.

Referring to FIG. 15, The over all effect of the extended method 1110 is to squeeze a transition area between the first and second colorants to a triangular region 1528 along a non-neutral colorant axis 1530, between an upper vertex point 1536 and a maximal first colorant point 1538.

The methods 610, 1110 are equally applicable to other colorants, such as, for example a magenta colorant pair M, M' and a yellow colorant pair Y, Y'. For example, similar mappings are done for a magenta colorant pair M, M' and a yellow colorant pair Y, Y'. Therefore, the extended method 1110 may be applied to each of the non-neutral colorant color specifications in a pixel. For example, a CMYK pixel is mapped to a set of CMYC'M'Y' colorant values by applying the extended method 1110 to the colorant color specifications ((C,K), (M,K), (Y,K)). In some instances, some of the colorant color specifications (C,K), (M,K), (Y,K) may only require mapping through the method 610.

Alternatively, CMYC'M'Y' values are generated through a blending process. For example, while one of the above described procedures maybe preferred for transforming saturated primary colors (cyan, magenta, and yellow, the above described procedure may not be best for the rendering of secondary colors (red, green, and blue) which are produced with combinations of primary colorants.

For example, while the second colorant C' may be best for rendering saturated cyan, the first colorant C may be best in a cyan-yellow combination to produce a saturated green. A procedure for accounting for this situation is to blend between mappings that map saturated color specifications to C and mappings that map saturated color specifications to C'. Therefore, in a blending step (see 1858 of FIG. 18) a first colorant placement and mapping that relates saturated cyan to the first colorant C, such as that described in reference to FIGS. 7–9, and a second colorant placement and mapping that relates saturated cyan to the second colorant C', such as described in relation to FIGS. 12–15 are blended together. For instance, if $C_a$ and $C'_a$ are colorant amounts determined by the first placement and mapping and $C_b$ and $C'_b$ are colorant amounts determined by the second placement and mapping, then blending equations such as:

$$C = w^* C_a + (1-w) C_b$$

$$C' = w^* C'_a + (1-w) C'_b$$

where w is a weighting factor ranging between, for example, one for green pixels, and zero for cyan pixels, can be used to determine appropriate colorant amounts. Preferably, w is the ratio of the yellow value to the maximum of the colorant values in the classic color or input color specification:

$$w = Y_0 / \max(C_0, M_0, Y_0)$$

Alternatively, the amount of yellow before undercolor removal may be used as the weighting factor ($w = Y_1 = 1 - B$). Those of ordinary skill in the art will understand how to use this technique to blend other colorant amounts. Those of ordinary skill in the art will understand how to apply this description to calculate weighting factors for other colorants.

Of course, however it is arrived at, once a full set of non-neutral colorant values (CMYC'M'Y') is determined, a redundant colorant undercolor removal step (e.g., see 1862 of FIG. 18) is applied to generate, for example, a CMYC'M'Y'K pixel.

Figure 16:
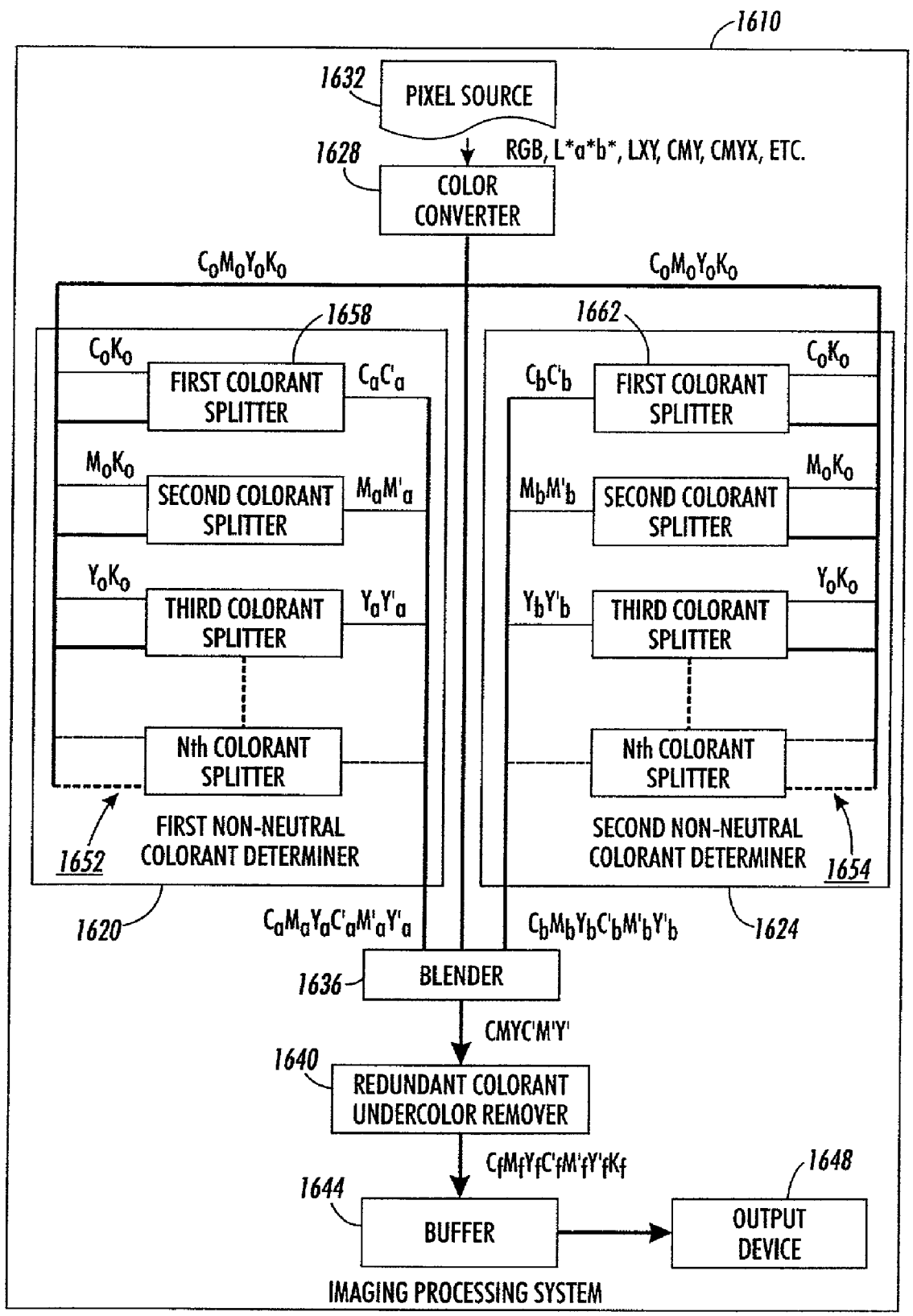
FIG. 16 is a block diagram of an image processor that includes a plurality of colorant splitters.

Referring to FIG. 16, an exemplary image processing system 1610 operative of carry out the method 610 or the extended method 1110 comprises a first non-neutral colorant determiner 1620 and a second non-neutral colorant determiner 1624. The colorant determiners 1620, 1624 receive an input pixel or complete color specification from a color converter 1628. The color converter receives a source pixel from an image source 1632. The colorant determiners 1620, 1624 deliver output to a blender 1636. The blender 1636, in turn, delivers output to a redundant colorant undercolor remover 1640. Output from the redundant colorant undercolor remover 1640 is accumulated in a buffer 1644. Eventually, data from the buffer is provided to an output device 1648.

The pixel source 1632 may be any image data source. For example, the pixel source 1632 is a scanner, an electronic file, a networked data source, a desktop publisher, a document processor, or a word processor. In short any image source may be a source of pixels for the image processing system 1610.

The color converter 1628 is an optional component. If pixels from the pixel source 1632 are directly compatible with the colorant determiners 1620, 1624 then the color converter is not required. If included, the color converter transforms a color specification in an input color space into a color specification in a colorant determiner 1620, 1624 color space. Additionally, the color converter 1628 performs any necessary or beneficial color correction. For example, the color converter 1628 processes a CMYK color space source pixel, even though an output color space is also CMYK. For example, the output of the color converter 1628 is adjusted to account for differences between a source or authoring device and the output device 1648. Color converters are known in the art. The output of the color converter is an input pixel for the colorant determiners 1620, 1624. If the color converter 1628 is not included in the system, then the source pixel is the input for the colorant determiners 1620, 1624.

Some systems include only one non-neutral colorant determiner. However, the exemplary image processing system 1610 includes a blender 1636. Where a blender is used, two or more colorant determiners are also used. Of course, instead of using two colorant determiners, a single colorant determiner may be used several times, each time with a different configuration, thereby generating output comparable to the output of the first 1620 and second 1624 colorant determiners.

The first and second non-neutral colorant determiners 1620, 1624 receive the input pixel and process it to generate output color specifications that include colorant values for colorants of similar hue. The colorant determiners 1620, 1624 each comprise a respective plurality of colorant splitters 1652, 1654. Each colorant splitter operates on a portion of the input pixel. For example, a first colorant splitter 1658 of colorant determiner. For example, the blender uses values in the input pixel to calculate a weighting factor, such as the weighting factor w described above. The weighting factor is used to generate a weighted combination set CMYC'M'Y' of the two sets of colorant values ($C_a,M_aY_aC'_aM'_aY'_a$ and $C_b,M_bY_b,C'_b,M'_bY'_b$). The weighted combination set (CMYC'M'Y') is delivered to the redundant colorant undercolor remover 1640.

Alternatively, if a blender is not included in the image processing system 1620 then only one colorant determiner is used. In that case, the output of the single colorant determiner is delivered to the redundant colorant undercolor remover 1640.

The undercolor remover 1640 operates to determine an appropriate amount of a neutral colorant K. Additionally, the undercolor remover 1640 operates to reduce some of the colorant values delivered to it. For example, the undercolor remover applies the equations described above, in reference to u, f, $K_f$, $C_f$ and $C'_f$ in order to generate a set of colorant values $C_fM_fY_fC'_fM'_fY'_fK_f$ or output pixel. The output pixel is delivered to the buffer 1644.

The buffer 1644 operates to accumulate output pixels until a complete image is assembled. Buffers are known in the art. Once a complete image or partial image is assembled, the image or partial image is delivered to the output device 1648.

The output device 1648 is any device capable of receiving an image. For example, the output device 1648 is a memory or mass storage device such as a disk drive or computer network. Often the output device is a rendering device such as a display screen or CRT or a print engine such as a computer printer. In a xerographic environment, the output device is often a xerographic printer. Xerographic printers are known in the art to comprise a fuser, a developer and an imaging member.

Figure 17:
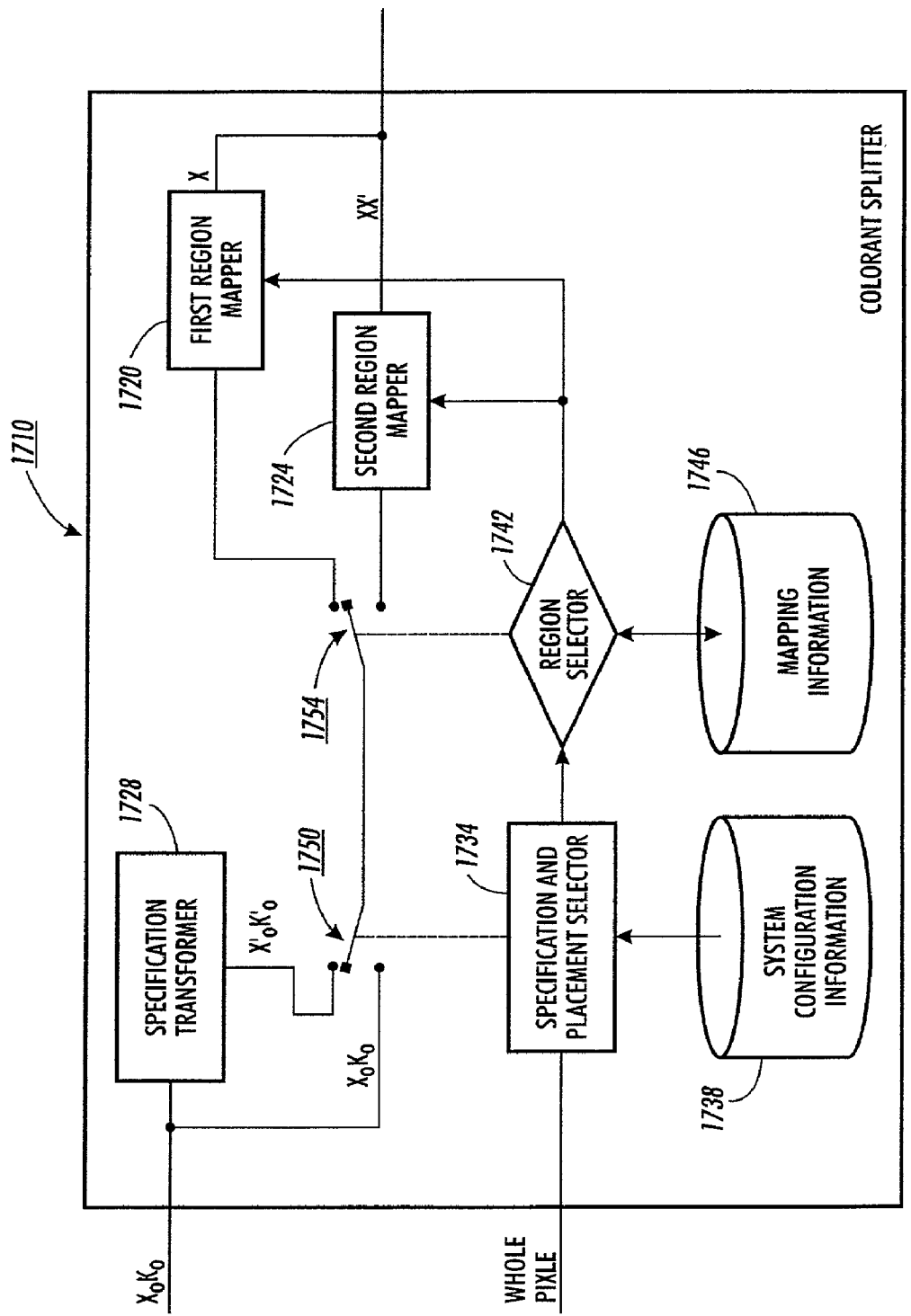
FIG. 17 is a block diagram of a typical colorant splitter operative to perform the method of FIG. 6 or the extended method of FIG. 11.

Referring to FIG. 17 an exemplary colorant splitter 1710 comprises a first region mapper 1720 and a second region mapper 1724. Additionally, the colorant splitter 1710 includes a specification transformer 1728, a specification and placement selector 1734, a system configuration information repository 1738, a region selector 1742 and a mapping information repository 1746.

The specification and placement selector 1734 receives information regarding the whole input pixel. Additionally the specification and placement selector 1734 has access to the system configuration information repository 1738. The specification and placement selector 1734 uses pixel information and information from the configuration repository 1738 to determine an appropriate placement of maximal colorant points in a color specification region, and whether or not the input color specification $X_0K_0$ should be transformed. For example, the specification and placement selector 1734 determines which of a set of embodiments of the method 600 or extended method 1100 is most appropriate for mapping the input color specification $X_0K_0$ to output colorant pairs, and the best placement of maximal colorant points and region divisions in the color specification space. For instance the colorant characteristics of colorants used in a target rendering device are described in the system configuration information repository 1738. The saturation and lightness as well as perhaps the cost and light fastness and/or other characteristics of the colorants are considered. Additionally, whether or not the color specification $X_0K_0$ is a primary color or part of a secondary color may be considered. For example, If the blender 1636 is not included, then the over all color specified by the whole pixel may be considered in the selection of a specification transformation or maximal colorant point placement. The specification and placement selector 1734 controls, for example a logical switch 1750, to direct either a transformed color specification generated by the specification transformer 1728, (if, for example, an embodiment of the extended method 1110 is the most appropriate mapping technique) or an untransformed color specification, to the first 1720 and/or second 1724 region mappers. Additionally the specification and placement selector 1734 passes selected mapping technique and maximal colorant placement information to the region selector 1742.

Alternatively, maximal colorant placement and specification transformation information are determined a priori, and the specification and placement selector 1734 is not included the colorant splitter 1710. For example, the logical switch 1750 is permanently set in one position. Alternatively, only one data path is made available and the logical switch is not included in the colorant splitter 1710.

The specification transformer 1728 transforms an input color specification to a new color specification region when such a transformation is useful. For example, the specification transformer 1728 applies the transformation described in reference to FIGS. 12 and 13 in order to take advantage of the maximal colorant placement of FIG. 12 while providing the ability to apply the mapping described in reference to FIGS. 7–9.

The region selector 1742 receives selected mapping technique and maximal colorant placement information and color specification information and determines which region (or sub-region) of the color specification region the color specification (transformed or not transformed) is related to. The region selector 1742 uses that information to access appropriate mapping information from the mapping information repository 1746 and passes it to an appropriate one of the first 1720 and second 1724 mappers. Alternatively the mappers 1720, 1724 access the mapping information 1746 directly. Additionally, the region selector 1742 directs the color specification information to the appropriate mapper. For example, the region selector 1742 controls a second logical switch 1754 to direct the color specification information to a selected one of the first 1720 and second 1724 region mappers.

When selected, the first and second mappers 1720, 1724 apply appropriate mapping equations to the color specification to generate output colorant values. For example, the mappers apply selected ones of the above-described mapping equations as directed by the region selector. Alternatively only one mapper is used. The single mapper applies first region mapping equations or second region mapping equations to the color specification as directed by the region selector.

The information repositories 1738, 1746 are typically embodied as databases or lookup tables. The information repositories 1738, 1746 may be embodied in any data storage medium. For example The information repositories 1738, 1746 may be stored in a computer memory or bulk storage devices such as disk drives or CDROM. Alternatively, the repositories are made available over a computer network.

Likewise the buffer 1644 is preferably implemented as a computer memory. However, the buffer 1644 may be implemented in any data storage medium.

The pixel 1632 source may be a hardware device or exist as stored or transmitted data. For example, the pixel source may be a scanner or digital camera. Alternatively, the pixel source 1632 is an electronic file or data stream.

Preferably, the output device 1648 is a rendering device. For example, the output device 1648 is a printer, such as for example a xerographic printer. Alternatively the output device 1648 is an image display device such as a CRT.

Preferably, the functions of the remainder of the components of the Image Processing system 1610 are implemented in software stored in a computer memory (not shown) and run on a computational device (not shown) such as, for example, a microprocessor or digital signal processor. Of course, the functions may be implemented differently and arranged in different functional groups.

Figure 18:
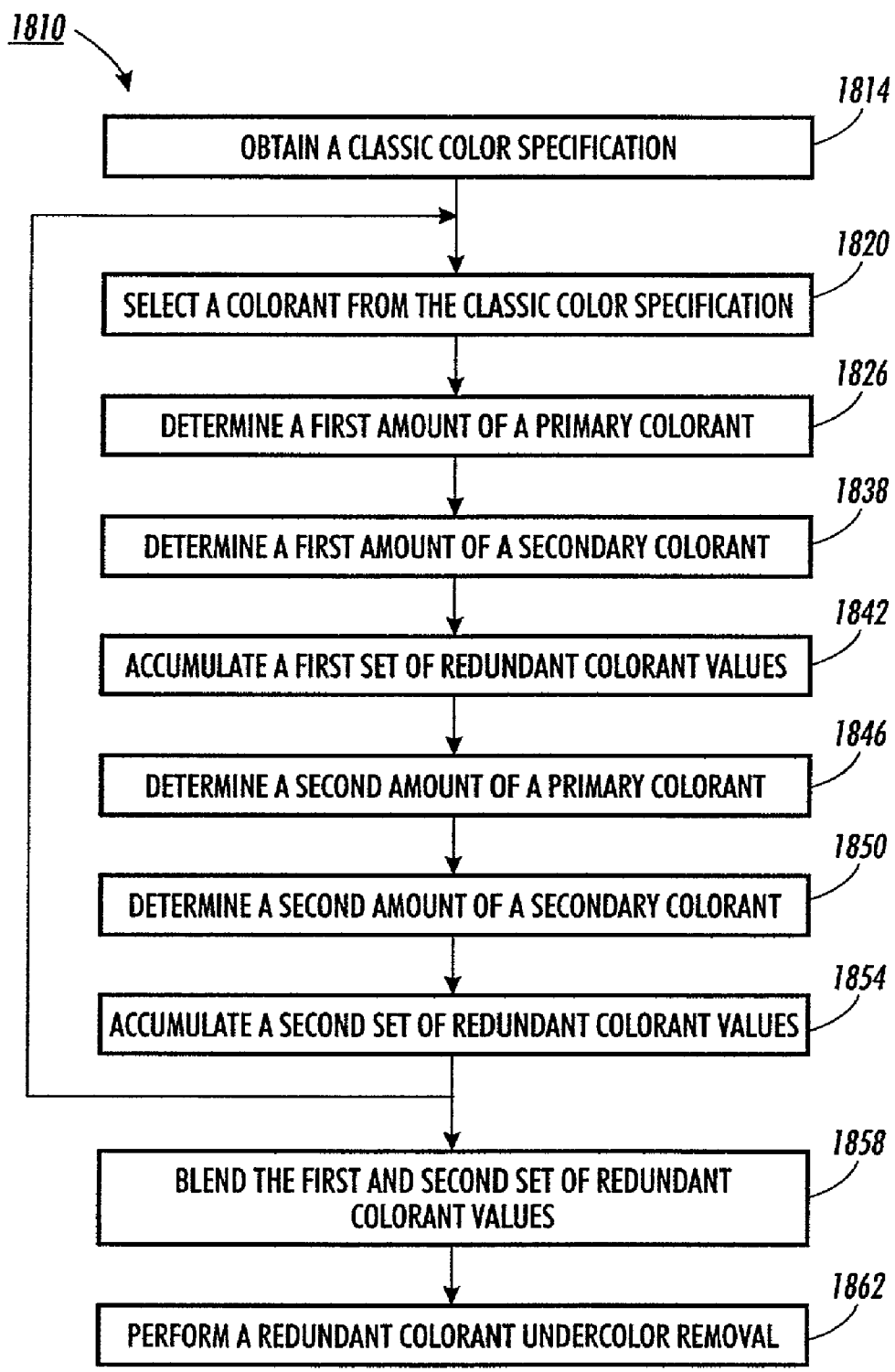
FIG. 18 is a flow diagram of an overall method for processing a classic color specifications to generate a color specification using redundant colorants.

Referring to FIG. 18, in summary, an image processing system such as the image processing system 1610 of FIG. 16 performs an overall pixel processing process 1810. The process beings by obtaining a classic color specification such as, for example, a pixel $C_0M_0Y_0K_0$, in a classic color specification obtaining step 1814. For instance, the classic color specification is obtained directly from a pixel source. Alternatively, the classic pixel is obtained from a color converter, which generates the classic pixel by processing a pixel from a pixel source. In a colorant value selection step 1820 a first colorant value is selected for mapping from the classic pixel. For example, a $C_0$ value is selected for mapping. Using a first embodiment of one of the method 610 or the the first non-neutral colorant determiner 1620 operates on a $C_0K_0$ portion of a $C_0M_0Y_0K_0$ input pixel. The output of each colorant splitter is a set of colorant values for a set of colorants related by a similar hue. For example, the output of the first colorant splitter 1658 of the first colorant determiner 1620 is a set of values $C_a,C'_a$ for colorants having a similar cyan hue, but varying in other characteristics, such as, for example, saturation and lightness. The colorant splitters generate output values by applying an embodiment of one of method 610 or the extended method 1110 to the portion of the input pixel the colorant splitter operates on. For example, the first colorant splitter 1658 of the first colorant determiner 1620 applies the embodiment of the method 610 described in reference to FIG. 7–FIG. 9 to the $C_0K_0$ portion of the input pixel to generate the values $C_a,C'_a$ for the colorants. A first colorant splitter 1662 of the second colorant determiner 1624 applies the embodiment of the extended method 1110 described in reference to FIG. 12–FIG. 15 to the $C_0K_0$ portion of the input pixel to generate the values $C_b,C'_b$ for the colorants.

The output of a colorant determiner comprises the combined output of each of the plurality of colorant splitters 1652, 1645 of the colorant determiner 1620, 1624. For example, the output of the first colorant determiner 1620 is a first set of non-neutral colorant values $C_a,M_aY_aC'_aM'_aY'_a$. The output of the second colorant determiner 1624 is a second set of non-neutral colorant values $C_b,M_bY_b,C'_b, M'_bY'_b$.

Figure 8:
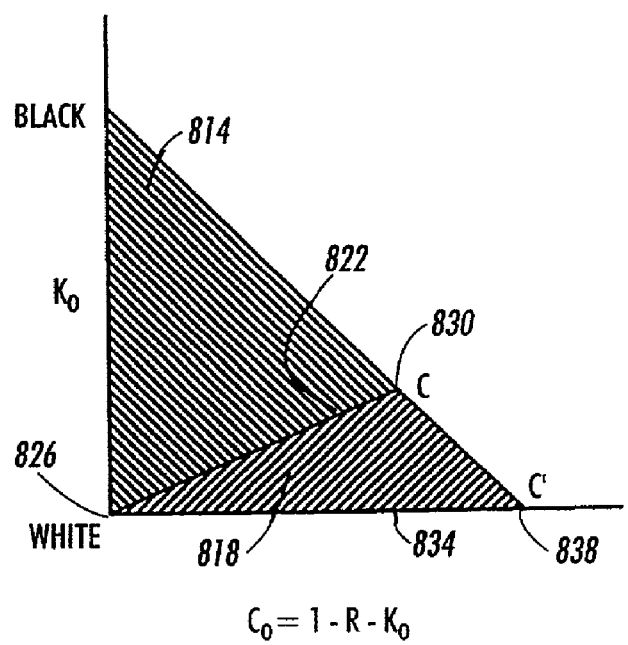
FIG. 8 shows the color specification region of FIG. 7 as it is being warped.
Figure 9:
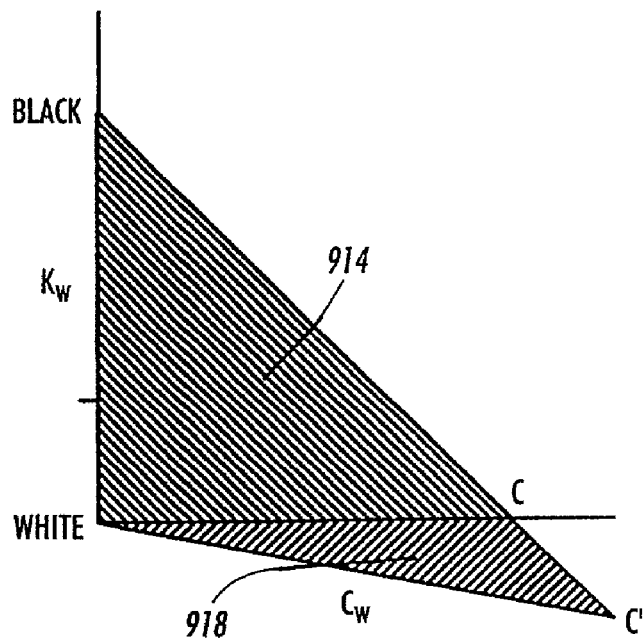
FIG. 9 shows the mapping of the upper region of FIG. 8.

The blender 1636 receives the first set of colorant values and the second set of colorant values as well as the whole input pixel. The blender 1636 operates to blend the values generated by the first colorant determiner with the values generated by the second extended method 1110 a first amount of a primary colorant is determined in a first primary colorant amount determining step 1826. Similarly the first embodiment is used in a first secondary colorant amount determining step 1838, to determine and amount of a secondary colorant. For example, the embodiment of the method 610 described in reference to FIG. 7–FIG. 9 is used to map a $C_0$ value to amounts of colorants $C_a$ and $C'_a$. Those amounts are accumulated in a first set of redundant colorants accumulation step 1842. Using a second embodiment of one of the method 610 or the extended method 1110 a second amount of a primary colorant is determined in a second primary colorant amount determining step 1846. Similarly the second embodiment is used in a second secondary colorant amount determining step 1850, to determine and amount of a secondary colorant. For example, the embodiment of the extended method 1110 described in reference to FIG. 12–FIG. 15 is used to map a $C_0$ value to amounts of colorants $C_b$ and $C'_b$. Those amounts are accumulated in a second set of redundant colorants accumulation step 1854. The steps 1820, 1826, 1838, 1842, 1846, 1850 and 1854 are repeated for other colorants. For example, $M_0$ is selected in the colorant selection step 1820 and processed through the remaining steps. Values of colorants $M_a$ and $M'_a$ are accumulated in the first set of redundant colorants accumulation step 1842 and values of colorants $M_b$ and $M'_b$ are accumulated in the second set of redundant colorants accumulation step 1854. Likewise $Y_0$ is eventually selected and values of $Y_a, Y'_a, Y_b, Y'_b$ are accumulated in there respective sets. In a blending step 1858 a blending process above is use to combine the values in the first and second sets of redundant colorant values into a set of blended redundant colorant values. For example, weighting factors such as, for example, weighing factor w described above, are used to blend values in the first $(C_a,M_aY_aC'_aM'_aY'_a)$ and second $(C_b,M_bY_b,C'_b, M'_bY'_b)$ set to generate a blended set of redundant colorant value such as the weighted combination set (CMYC'M'Y'). A set of redundant colorants is processed in an redundant colorant undercolor removal step 1862 to generate an output pixel. For example, the weighted combination set (CMYC'M'Y') is processed through the redundant colorant undercolor removal process described above to generate an output pixel $C_fM_fY_fC'_fM'_fY'_fK_f$.

As mentioned above, not all embodiments use blending. In embodiments that do not use blending steps 1846, 1850 and 1854 are not performed and the first set of redundant colorant values $(C_a,M_aY_aC'_aM'_aY'_a)$ is processed in the redundant colorant undercolor removal step 1862.

The invention has been described with reference to particular embodiments. Modifications and alterations will occur to others upon reading and understanding this specification. It is intended that all such modifications and alterations are included insofar as they come within the scope of the appended claims or equivalents thereof.

What is claimed is:

1. A method of mapping a color specification to colorant amounts when a projected region of color space is to be produced by a selection of colorants from a set of colorants including a first colorant, a second colorant and a third colorant, the second colorant being of similar hue with respect to the first colorant, the method comprising:
   designating a first portion of the region to be produced by a first subset of colorants consisting of two of the first, second and third colorants;
   designating a second portion of the region to be produced by a second subset of the first, second and third colorants that is different from the first subset; and
   mapping the color specification into colorant amounts based on the designated portions.

2. The method of mapping a color specification of claim 1 wherein designating the first portion and designating the second portion comprise:
   designating the first portion of the region to be produced by the first colorant and a neutral colorant; and
   designating the second portion of the region to be produced by the first colorant and the second colorant.

3. The method of mapping a color specification of claim 1 wherein designating the first portion and the second portion further comprise:
   designating the first portion of the region to be produced by the second colorant and a neutral colorant; and designating the second portion of the region to be produced by the first colorant, second colorant and the neutral colorant.

4. The method of mapping a color specification of claim 1 wherein a projected region of color specification space for the similar hue is plot-able in relation to a neutral colorant axis indicative of a gamut of neutral colorant and a non-neutral axis, the non-neutral axis being indicative of a gamut of the similar hue, the region being plotted as a continuous finite area and designating the first portion and the second portion comprise:

dividing the continuous finite area into a first sub-area and a second sub-area with a border, the border oriented so neutral axis values change in proportion to non-neutral axis values as one moves along the border.

5. The method of mapping a color specification of claim 1 wherein a projected region of color specification space for the similar hue is plot-able in relation to a neutral colorant axis indicative of a gamut of neutral colorant and a non-neutral axis, the non-neutral axis being indicative of a gamut of the similar hue, the region being plotted as a continuous finite area and designating the first portion and the second portion comprise:

dividing the continuous finite area into a first sub-area bounded by points that specify black, white and a maximum of a darker of the first and second colorants and a second sub-area bounded by points that specify white and each of the first and second colorant.

6. The method of mapping a color specification of claim 1 wherein a projected region of color specification space for the similar hue is plot-able in relation to a neutral colorant axis indicative of a gamut of neutral colorant and a non-neutral axis, the non-neutral axis being indicative of a gamut of the similar hue, the region being plot-able as a region triangle and designating the first portion and the second portion comprise:

dividing the region triangle into a first sub-triangle and a second sub-triangle with a dividing line extending from a white point in the color specification space to a point on a hypotenuse of the region triangle.

7. The method of mapping a color specification of claim 1 wherein the projected region of color specification space for the similar hue is plot-able in relation to a neutral colorant axis indicative of a gamut of neutral colorant and a non-neutral axis, the non-neutral axis being indicative of a gamut of the similar hue, therefore, the region being plotted as a region triangle and designating the first portion and the second portion comprise:

dividing the region triangle into a first sub-triangle and a second sub-triangle with a dividing line extending from a black point in the color specification space to an intermediate point on the non-neutral axis.

8. The method of mapping a color specification of claim 1 wherein a projected region of color specification space is plot-able in relation to a neutral colorant axis indicative of a gamut of neutral colorant and a non-neutral axis, the non-neutral axis being indicative of a gamut of the similar hue, therefore, the region being plotted as a region triangle and designating the first portion and the second portion comprise:

dividing the region triangle into a first sub-triangle and a second sub-triangle with a border, the border oriented so neutral axis values change in inverse proportion to non-neutral axis values as one moves along the border.

9. The method of mapping a color specification of claim 1 wherein a projected region of color specification space for the similar hue is plot-able in relation to a neutral colorant axis indicative of a gamut of neutral colorant and a non-neutral axis, the non-neutral axis being indicative of a gamut of the similar hue, therefore, the region being plotted as a region triangle and designating the first portion and the second portion comprise:

dividing the region triangle into a first sub-triangle and a second sub-triangle with a dividing line extending from a black point in the color specification space to an intermediate point on the non-neutral axis.

10. The method of mapping a color specification of claim 1 wherein the region is degenerate and therefore, before the step of designating a first portion the method further comprises:

transforming the region so that the transformed region is non-degenerate and wherein the remaining steps are performed on the transformed region.

11. The method of mapping a color specification of claim 1 wherein points in color specification space corresponding to extreme amounts of the first, second and third colorants are collinear, the method further comprising:

transforming the region so that the three transformed points are no longer collinear and define a region having a nonzero area.

12. The method of claim 1 further comprising:

placing maximal colorant points in the specification region at locations based on saturation and lightness characteristics of the colorants.

13. The method of claim 12 wherein placing maximal colorant points further comprises:

placing a darker and most saturated of the first and second colorants at a most saturated point in the color specification region; and placing a lighter and less saturated of the first and second colorants at a point between the most saturated point and a white point.

14. The method of claim 10 wherein transforming the region comprises:

segmenting the region into a first segment, a second segment and a third segment, wherein the first segment is bounded by points that specify white, a relatively light intermediate neutral color and a maximum of a lighter of the first and second colorants, the second segment is bounded by points that specify the maximum of the lighter of the first and second colorants, the relatively light intermediate neutral color, a relatively dark intermediate neutral color and a maximum of the darker of the first and second colorant, and the third segment is bounded by points that specify the maximum of the darker colorant, the darker intermediate neutral color, and black;

warping the region so that the point that specifies the maximum of the lighter of the first and second colorants is positioned within the warped region to be a mapping for a color specification calling for a maximum of the similar hue, and the point that specifies a maximum of the darker of the first and second colorants is positioned within the warped region to be a mapping for a color specification calling for a point positioned between the black specification point and the point for the maximum of the similar hue.

15. A method of mapping a classic color description to a redundant colorant color description comprising:

obtaining an input color specification defined in a classic color coordinate system; and for each non-neutral colorant value in the classic color description:

determining an first amount of a primary colorant;

determining an first amount of a secondary colorant, said secondary colorant having substantially the same hue as the primary colorant; and, arranging the first primary and secondary colorant amounts determined for each colorant value in the classic color description as a first redundant colorant color description containing non-neutral colorant values.

16. The method of claim 15 further comprising:

applying a redundant colorant under color removal process to the first redundant colorant color description containing non-neutral colorant values to generate a redundant color description including a neutral colorant value.

17. The method of claim 15, wherein determining the first amounts of primary and secondary colorants is carried out such that one of the first and second colorants is favored thereby conserving the other.

18. The method of claim 15, further comprising:

dividing into first and second regions an output color gamut achievable by employing the first and second colorants.

19. The method of claim 18, wherein the first amounts of primary and secondary colorants are determined such that renderings corresponding to the first region are achieved employing substantially none of the second colorant and renderings corresponding to the second region are achieved employing a blend of the first and second colorant.

20. The method of claim 15 further comprising:

for each non-neutral colorant value in the classic color description:
  determining an second amount of a primary colorant;
  determining an second amount of a secondary colorant, the secondary colorant having substantially the same hue as the primary colorant, the first and second amounts being determined in a manner different than the first amounts; and, arranging the second primary and secondary colorant amounts determined for each colorant value in the classic color description, as a second redundant colorant color description containing non-neutral colorant values; and blending the first redundant colorant color description and the second redundant color description to generate a blended redundant colorant color description.

21. The method of claim 20 further comprising:

applying a redundant colorant under color removal process to the blended redundant colorant color description to generate a redundant color description including a neutral colorant value.

22. An image processing system operative to map a color specification to output colorant amounts where the output colorants include two colorants of similar hue, the image processing system comprising:

a first colorant splitter operative to receive the color specification and map the color specification to similar hue output colorant values.

23. The image processing system of claim 22 wherein the first colorant splitter is included in a first non-neutral colorant determiner, the first non neutral colorant determiner comprising:

a first plurality of colorant splitters, each colorant splitter operative to receive a subset of values from an input pixel and generate a subset of output pixel values, the subset of output pixel values including two colorant values for two colorants of similar hue, the output of each of the plurality of colorant splitters being combined to form a first intermediate pixel.

24. The image processing system of claim 23 further comprising:

an undercolor remover operative to perform undercolor removal on the intermediate pixel to generate an output pixel that includes a neutral colorant value.

25. The image processor of claim 23 further comprising:

a second non-neutral colorant determiner operative to map the input pixel to an output pixel in a manner different than the first non-neutral colorant determiner, the second non-neutral colorant determiner comprising a second plurality of colorant splitters, each colorant splitter operative to receive a subset of values from an input pixel and generate a subset of output pixel values, the subset of output pixel values including two colorant values for two colorants of similar hue, the output of each of the plurality of colorant splitters being combined to form a second intermediate pixel;

a blender operative to receive the input pixel and first and second intermediate pixels, and to perform a weighted blend of the first and second intermediate pixels based on colorant values of the input pixel to generate a blended output pixel; and an undercolor remover operative to receive the blended output pixel and perform undercolor removal on the blended output pixel to generate an output pixel that includes a neutral colorant value.

26. The image processing system of claim 22 further comprising:

a buffer operative to accumulate output pixels to generate an output image; and an output device operative to receive the image.

27. The image processing system of claim 22 wherein the output device comprises:

a xerographic printer.

28. The image processing system of claim 22 wherein the output device comprises:

an inkjet printer.

* * * * *